Patented Apr. 21, 1925.

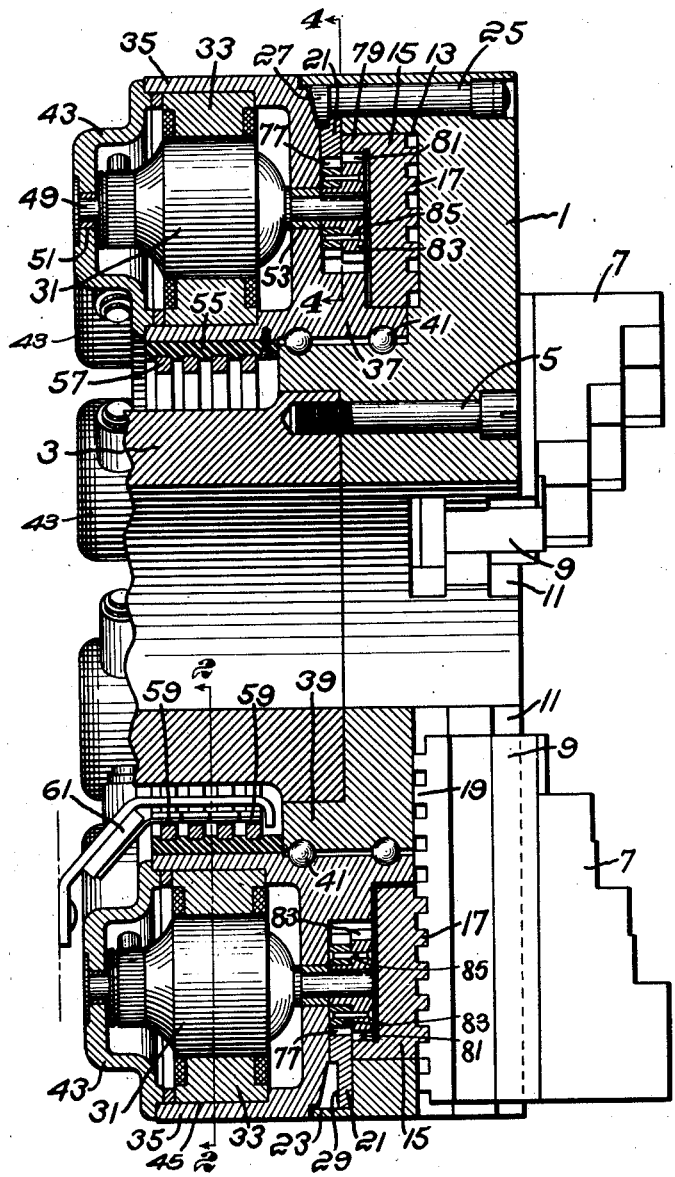

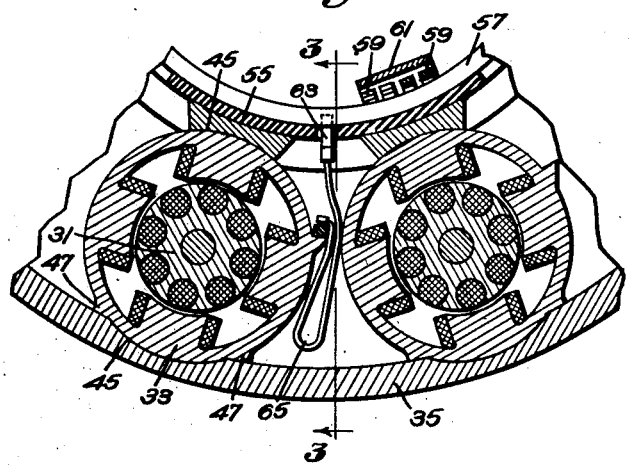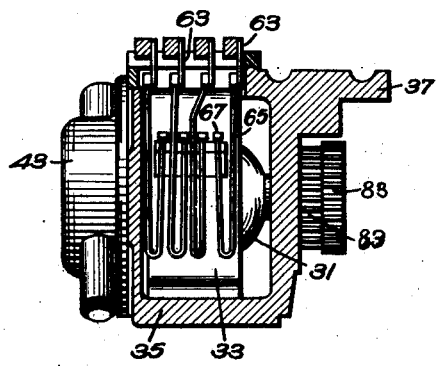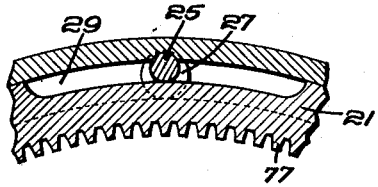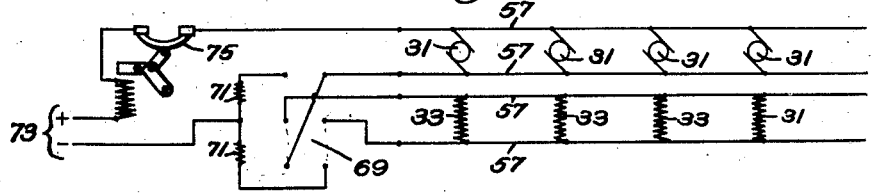

1,534,572

UNITED STATES PATENT OFFICE.

WALLACE M. CUTLER, OF WINDSOR LOCKS, CONNECTICUT, ASSIGNOR TO THE E. HORTON & SON COMPANY, OF WINDSOR LOCKS, CONNECTICUT, A CORPORATION OF CONNECTICUT.

CHUCK.

Application filed February 12, 1924. Serial No. 692,401.

*To all whom it may concern:*

Be it known that I, WALLACE M. CUTLER, a citizen of the United States, and a resident of Windsor Locks, in the county of Hartford, State of Connecticut, have invented an Improvement in Chucks, of which the following description, in connection with the accompanying drawings, is a specification, like characters on the drawings representing like parts.

My invention relates to chucks and particularly but not exclusively to one for use in connection with lathes.

My invention will be best understood from the following description when read in light of the accompanying drawings showing one specific embodiment of my invention selected for illustrative purposes, while the scope of my invention will be more particularly pointed out in the appended claims.

In the drawings:—

Fig. 1 is a longitudinal section of the chuck constructed according to my invention with parts shown in elevation;

Fig. 2 is a fragmentary section on the line 2—2 of Fig. 1;

Fig. 3 is a section on the line 3—3 of Fig. 2;

Fig. 4 is a fragmentary section on the line 4—4 of Fig. 1; and

Fig. 5 is a wiring diagram.

Referring to the drawings I have shown a chuck having a forward body member 1 and a rearward body member 3, the latter which in practice is attached to the spindle of the lathe being secured to the body member 1 by means of screws or bolts 5. The body member carries any suitable form of work gripping means which as herein illustrated take the form of jaws 7, the bases 9 of which are positioned in radially disposed guideways 11 formed in and opening on the forward face of the body member 1, and it will be understood by this construction that the jaws may be moved radially toward or away from the axis of the chuck so as to grip or release the work.

For giving the jaws their radial movement I mount for rotation in the annular recess 13 formed on the rearward side of the body member 1 a scroll wheel 15, the scroll wheel having formed on its forward face a scroll cam 17 which meshes with suitably formed rack teeth 19 on the rearward face of the bases 9 of the jaws. By this construction it will be understood that by rotating the scroll wheel relatively to the body of the chuck radial movement of the jaws will be caused, the direction of radial movement being dependent upon the direction of rotation of the scroll wheel.

For holding the scroll wheel in the recess 13 I mount a ring 21 in the annular enlargement 23 of the recess 13, the ring being held in position by means of bolts 25, the heads 27 of which fit into the reduced portion 29 formed on the rearward face of the ring adjacent its periphery. As clearly illustrated by Fig. 4 the ring 21 adjacent the bolts 25 is provided with slots 29 on its periphery, which construction permits the ring to have a limited rotative movement relatively to the body for a purpose which will hereinafter appear.

For rotating the scroll wheel relatively to the body of the chuck I provide one or more electric motors, the rotors of which are indicated at 31 and the stators at 33.

Any suitable form of electric motor may be provided, and as herein indicated the motors are of the direct current series wound type with stationary fields and rotating armatures. These motors are carried on a carrier member 35 mounted for rotation on the body, the carrier member for this purpose being provided with a forwardy extending sleeve 37 surrounding the hub portion 39 of the forward body member 1, and being supported and retained in position thereon by means of the spherical anti-friction rollers 41.

Referring particularly to Figs. 1, 2 and 3 I have shown the carrier 35 formed as a hollow casting generally speaking of square cross section and provided with openings closed by cover plates 43 to allow the motors to be removably placed inside the carrier. For this purpose the stator or field pieces 33 of the motors are formed generally speaking with cylindrical exteriors, fitting into cylindrical counter bores 45 formed in the internal annular walls of the carrier, the lugs 47 preventing the stators of the motors from turning relatively to the carrier. As indicated in Fig. 1 the commutator ends of the armature shafts 49 are mounted in bearings formed in the cover plates, while the opposite ends of the shafts are mounted in bearings 53 formed in the forward transverse wall of the carrier.

For conducting the energy to the motor I mount interiorly of the carrier a ring 55 of insulating material, the latter carrying interiorly thereof four rings 57 of conducting material, one pair of the rings being connected to the terminals of the field windings and the other pair to the terminals of the armature windings of the motors. Coacting with each ring is a brush 59 carried by a common brush holder 61 mounted on a stationary part of the lathe so as to form with the rings 57 four slip-ring connections for energizing the motors.

As indicated in Figs. 2 and 3 each ring 57 carries adjacent each motor a clip 63 connected by a flexible conductor 65 to the appropriate terminal 67 of the motor, the conductor 65 being of such length as to permit the motors being slipped out of the carrier without disconnecting the conductors 65 from the terminals 67.

The motor circuit is shown diagrammatically in Fig. 5 in which the conductors 57 indicate the four rings 57 of the chuck. It will be noted that the armatures 31 are connected in parallel across one pair of conductors or rings 57 and that the field windings 33 are connected in parallel across the other pair of conductors or rings 57. It will be further noticed that the lower three conductors 57 as viewed in Fig. 5 are connected to the appropriate terminals of a pole changing switch 69 which is connected through suitable starting resistances 71 to one side of any suitable source of potential 73, and that the other side of the source of potential is connected through an overload circuit breaker to the upper conductor 57 as viewed in Fig. 5. As will be obvious to those skilled in the art by means of the pole changing switch 69 the armatures or rotors of the motors may be caused to rotate in either of opposite directions or to remain at rest relatively to the fields or stators.

It will be observed that if the rotors of the motors are geared to the body of the chuck when the rotors are energized the carrier will be rotated and carry with it the motors, the latter of course under these circumstances having an orbital motion about the axis of the chuck. Under these circumstances I may cause the rotation of the carrier or the orbital movement of the motor, preferably the latter, to actuate the scroll wheel. To this end I form the ring 21 with a peripheral surface of the ring 21 with a series of annular gear teeth 77 and provide the rearward face of the scroll wheel with the peripheral flange 79 which interiorly is formed with a series of internal gear teeth 81. The forward end of the armature shafts 49 of the motors carry a pair of pinions 83, the right hand or larger pinion being keyed to the armature shaft, and the left hand or smaller pinion being fixedly secured to the other pinion by means of pins 85. It will be observed by this construction that the two pinions 83 together form a differential pinion, and as the gear ratios of these pinions with internal gears 77 and 83 are slightly different, when the rotors of the motors are energized the scroll wheel will be given a motion much slower than that of the carrier 35, or in other words that a reduction gearing is formed for transmitting the motion of the motors to the scroll wheel or jaws. The object of providing a lost motion connection between the ring 21 and the body, which ring is normally stationary relatively to the body, is to permit a hammer blow to be given to the jaws, it being observed that when the direction of rotation of the rotors is reversed the ring 21 will move relatively to the body a distance permitted by the slots 29, and in consequence of the sudden arresting of this relative motion due to the ends of the slots coming up against the bolts 25 a blow will be imparted to the jaws.

Although I have described for purposes of illustration one specific embodiment of my invention it is to be understood that I am not limited thereby to its particular mechanical details, but that within the scope of my invention wide deviations may be made therefrom without departing from the spirit of my invention.

Claims—

1. A chuck having in combination, a body, radially moving jaws carried by said body, a scroll wheel rotatably supported on said body and operatively connected to said jaws whereby rotation of said scroll wheel in opposite directions will move said jaws in opposite directions, an internal gear carried by said body, an internal gear carried by said scroll wheel, a differential pinion meshing with both internal gears and forming therewith gear sets of slightly different gear ratio, a carrier rotatably mounted on said body, an electric motor having a rotor and stator both carried by said carrier, the rotor of said motor being connected in driving relation to said differential pinion, and control means for said motor for causing the rotor thereof to rotate relatively to the stator thereof in opposite directions or said rotor to be at rest relatively to said stator.

2. A chuck having in combination, a body, radially moving jaws carried by said body, a scroll wheel rotatably supported on said body and operatively connected to said jaws whereby rotation of said scroll wheel in opposite directions will move said jaws in opposite directions, an internal gear carried by said body, an internal gear carried by said scroll wheel, a plurality of differential pinions each meshing with both internal gears and forming therewith gear sets of different gear ratios, a carrier rotatably mounted on said body, a plurality of electric motors each having a rotor and a stator and being carried in spaced angular relation by said carrier, the rotors of said motors being connected in driving relation to said differential pinions, and control means for said motors for causing the rotors thereof to rotate relatively to the stators or said rotors to be at rest relatively to said stators.

3. A chuck having in combination, a body, work gripping means carried by said body, an electric motor mounted on said body for orbital movement relatively to said body, and reduction gearing actuated by said motor for operating said work gripping means.

4. A chuck having in combination, a body, work gripping means, an electric motor, said motor having a rotor mounted for axial rotation and for orbital movement relatively to said body, and differential reduction gearing operated by said axial rotation and orbital movement for causing said work gripping means to be actuated.

5. A chuck having in combination, a body, work gripping means, operating means for said work gripping means comprising an electric motor having a rotor mounted eccentrically to said body on a carrier mounted coaxially with said body, a gear carried by said body coaxially therewith, and a pinion driven by said rotor and meshing with said gear whereby rotation of said rotor causes rotation of said carrier relatively to said body.

6. A chuck having in combination, a body, work gripping means carried by said body, actuating means for said work gripping means, said actuating means comprising a gear mounted for rotation on said body, a gear normally stationary relatively to said body, a differential pinion meshing with both of said gears and forming therewith gear sets of different ratio, an electric motor having a rotor mounted eccentrically of said body for orbital movement, and said rotor being connected in driving relation to said pinion.

7. A chuck having in combination, a body, work gripping means carried by said body, a carrier member mounted for rotation coaxially of said body, an electric motor mounted on said carrier member and having a rotor member eccentric to the axis of said body, a gear carried by said body, said gear being normally stationary relatively to said body, a pinion meshing with said gear, said pinion being driven by said rotor member whereby said carrier member is rotated and said rotor member is given an orbital movement about the axis of said body, and actuating mechanism for said work gripping means driven by one of said members.

8. A chuck having in combination, a body, work gripping means carried by said body, an electric motor having a rotor mounted eccentrically to said body for orbital movement relatively to the axis of said chuck, and driving mechanism including reduction gearing and a lost motion connection for causing said rotor to actuate said work gripping means.

In testimony whereof, I have signed my name to this specification.

WALLACE M. CUTLER.